United States Patent [19]

Nesline, Jr.

[11] Patent Number: 5,064,141

[45] Date of Patent: Nov. 12, 1991

[54] COMBINED SENSOR GUIDANCE SYSTEM

[75] Inventor: F. William Nesline, Jr., Lexington, Mass.

[73] Assignee: Raytheon Company, Lexington, Mass.

[21] Appl. No.: 483,141

[22] Filed: Feb. 16, 1990

[51] Int. Cl.⁵ .............................................. G05D 1/08
[52] U.S. Cl. ................................... 244/3.15; 364/462; 364/435
[58] Field of Search ...................... 244/3.15, 3.19, 3.2; 364/454, 462, 434, 435

[56] References Cited

U.S. PATENT DOCUMENTS

| 4,037,202 | 7/1977 | Terzian . | |
| 4,529,151 | 7/1985 | Skarman | 244/3.15 |
| 4,783,744 | 11/1988 | Yueh | 364/454 |
| 4,791,573 | 12/1988 | Zemany et al. | 364/454 |

OTHER PUBLICATIONS

Thomas Kailath, Linear Systems, "Asymptotic Observers and Compensator Design," 1980, by Prentice-Hall, Inc., Chapter 4, pp. 259-313.
David G. Luenberger, "An Introduction to Observers," IEEE Transactions on Automatic Control, vol. AC-16, No. 6, Dec. 1971, pp. 596-602.

Primary Examiner—Mark Hellner
Attorney, Agent, or Firm—Donald F. Mofford; Richard M. Sharkansky

[57] ABSTRACT

A guidance system for a homing missile having an observer filter which utilizes signals representative of range, range rate, acceleration normal to the line-of-sight of the missile, acceleration along the line-of-sight of the missile, and line-of-sight rate of the missile to a target is described. The filter includes means, responsive to a lateral acceleration signal, a measured range rate signal and a range signal for providing an estimated line-of-sight rate signal. The measured line-of-sight rate signal and the estimated line-of-sight rate signal are used to produce a difference output signal. The difference output signal is used to produce an error signal which is applied to the providing means to minimize the difference output signal. The estimated line-of-sight rate signal provides a more accurate estimate of the actual line-of-sight rate of the missile to the target than that which can be obtained with a standard proportional navigation system.

6 Claims, 5 Drawing Sheets

COMBINED SENSOR GUIDANCE SYSTEM

This invention was made with Government support under Contract No. DAAH01-82-C-A319 awarded by the Department of the Army. The Government has certain rights in this invention.

BACKGROUND OF THE INVENTION

This invention pertains generally to missile guidance systems, and particularly to an improved guidance system wherein missile lateral and longitudinal acceleration signals are combined with a line-of-sight rate signal and a closing velocity signal to derive the requisite guidance signals.

As it is known, most homing missiles utilize a proportional navigation guidance system wherein signals representative of the missile line-of-sight rate and closing velocity between the missile and a target are used to derive the requisite guidance control signals. The signals representative of the closing velocity and line-of-sight rate are multiplied by an effective navigation ratio, $N^1$, to develop acceleration commands that are used to control actual missile acceleration. In a benign environment (meaning in the absence of countermeasures), target maneuver, scintillation noise and angle noise in the missile seeker are major contributors to causing a high miss distance in a proportional navigation guidance system. In a hostile environment (meaning countermeasures are present), homing missiles employing a proportional navigation guidance system are particularly vulnerable to multiple blinking jammers and velocity gate pulloff jammers.

As it is also known, a multiple blinking jammer provides a jamming signal whose spectrum covers the bandpass of the victim radar with a duty cycle (i.e. blinking rate) that confuses the victim radar, whereas a velocity gate pulloff jammer produces a signal which, when received by the victim radar, causes the victim radar to loose velocity tracking of the target. With either multiple blinking jamming or velocity gate pulloff jamming, such techniques cause the victim radar to loose track of the target. Thus, the victim radar must go into a reacquistion mode to reacquire the target.

Accordingly, it would be desirable to provide a guidance system which will produce appropriate command signals to facilitate reacquisition of the target when the guidance system returns to a target reacquisition mode.

SUMMARY OF THE INVENTION

In accordance with the present invention, a guidance system for a homing missile having an observer filter which utilizes signals representative of range, range rate, acceleration normal to the line-of-sight of the missile, acceleration along the line-of-sight of the missile, and line-of-sight rate of the missile to a target is provided. The filter includes a first means, responsive to a lateral acceleration signal that is representative of the acceleration normal to the line-of-sight of the missile, a measured line-of-sight rate signal that is representative of the line-of-sight rate of the missile, a measured range rate signal that is representative of the range rate of the missile and a range signal that is representative of the range of the missile to the target, for providing an estimated line-of-sight rate signal. The measured line-of-sight rate signal and the estimated line-of-sight rate signal are used to produce a difference output signal. The difference output signal is used to produce an error signal which is applied to the first providing means to minimize the difference output signal. With this particular arrangement, the estimated line-of-sight rate signal provides a more accurate estimate of the actual line-of-sight rate of the missile to the target than that which can be obtained with a standard proportional navigation system.

In accordance with a further aspect of the present invention, an observer filter fed by a plurality of signals including a range signal that is representative of range from a missile to a target, a measured range rate signal that is representative of range rate (also referred to as closing velocity) from the missile to the target, a lateral acceleration signal that is representative of acceleration normal to the line-of-sight of the missile, a longitudinal acceleration signal that is representative of acceleration along the line-of-sight of the missile and a measured line-of-sight rate signal that is representative of line-of-sight rate of the missile to the target. The observer filter includes estimated range rate means, responsive to an estimated line-of-sight rate signal, the longitudinal acceleration signal and the measured range rate signal, for providing the estimated range rate signal. The observer filter also includes an estimated range means, responsive to the estimated range rate signal, for providing an estimated range signal and an estimated line-of-sight rate means, responsive to the measured line-of-sight rate signal, the estimated range rate signal, the estimated range signal and the lateral acceleration signal, for providing the estimated line-of-sight rate signal. The estimated range rate signal and the estimated line-of-sight rate signals provide, respectively, improved range rate estimates and improved line-of-sight rate estimates that are characteristic of the true range rate and line-of-sight rate from the missile to the target. The improved range rate estimate and the improved line-of-sight rate estimate provide a reduction in miss distance due to range independent and range dependent noise, reduces the vulnerability of the homing missile to velocity gate pulloff jammers, and increases the allowable lost signal guidance (coast) time.

In accordance with a further aspect of the present invention, the estimated range rate means includes a range acceleration means, responsive to the longitudinal acceleration signal, the estimated line-of-sight rate signal and the estimated range signal, for providing a range acceleration signal and means, responsive to the measured range rate signal and the estimated range rate signal, for producing a range rate difference signal. The range rate difference signal is minimized by range rate error signal means, responsive to the range rate difference signal, for providing a range rate error signal that is added to the range acceleration signal. Additionally, the estimated line-of-sight means includes means, responsive to the measured line-of-sight rate signal and the estimated line-of-sight rate signal, for producing a line-of-sight difference signal. The line-of-sight difference signal along with the lateral acceleration signal, the estimated range signal, and the estimated range rate signal is used to produce a line-of-sight acceleration signal, which is then used to produce the estimated line-of-sight rate signal. With such an arrangement, a missile with four seconds of coast in the middle of a ten second flight, instead of loosing the target, will have a miss distance of approximately 12 feet.

BRIEF DESCRIPTION OF THE DRAWINGS

For a more complete understanding of this invention, reference is now made to the following description of the accompanying drawings, wherein.

DESCRIPTION OF THE PREFERRED EMBODIMENT

Before embarking on a detailed exposition of the contemplated guidance system, it should be noted that the operation of homing missiles is well known to those of skill in the art, and, therefore, the operation of such missiles will not be described in detail.

Figure 1:
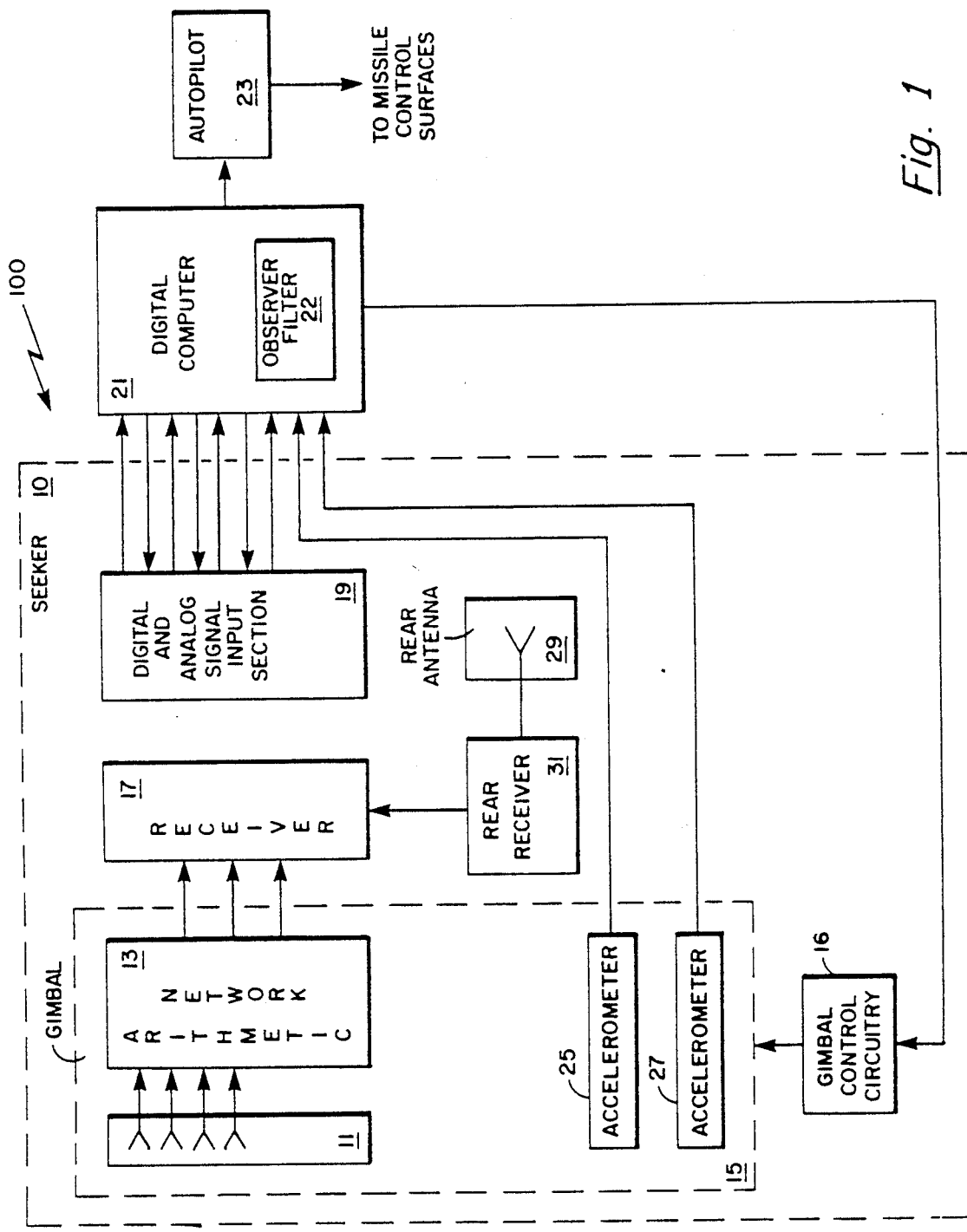
FIG. 1 is a simplified block diagram of a homing missile seeker according to this invention.

Referring now to FIG. 1, a guidance system 100 for a homing missile (not shown) according to this invention is shown to include a digital computer 21, an autopilot 23 and a seeker 10 including a monopulse antenna 11, a monopulse arithmetic network 13, a gimbal 15, a receiver 17, a digital and analog signal input section 19, a rear receiver 31, a rear antenna 29, gimbal control circuitry 16, a longitudinal accelerometer 25 and a lateral accelerometer 27.

The monopulse antenna 11 and the monopulse arithmetic network 13, both of which are shown to be mounted on the gimbal 15, develops monopulse sum and difference signals that are passed to the receiver 17. The latter is effective, inter alia, to downconvert the monopulse signals to suitable baseband video signals and to form boresight error and Doppler error signals. The output signals from the receiver 17 are digitized in the digital and analog signal input section 19 forming input signals to the digital computer 21. Digital computer 21, which may be similar to that described in U.S. Pat. No. 4,037,202, issued July 19, 1977, entitled "Microprogram Controlled Digital Processor Having Addressable Flip/Flop Sections," which patent is assigned to the same assignee as this application and is incorporated herein by reference, is effective, in a manner to be described in detail hereinafter, to derive requisite guidance signals to effect a target intercept. Here in addition to that described in the disclosed patent, the digital computer also includes circuitry (not shown) for forming an observer filter 22 that develops the requisite guidance signals. The guidance signals from the digital computer 21 are passed to the autopilot 23 which is effective to convert the guidance signals to equivalent control signals for controlling missile control surfaces (not shown). The digital computer 21 also provides control signals to the gimbal control circuitry 16 for controlling the gimbal 15. The digital computer 21 also receives input signals from the longitudinal accelerometer 25 and the lateral accelerometer 27 which are mounted on the gimbal 15.

Completing guidance system 100 are the rear antenna 29 and the rear receiver 31. The rear antenna 29 intercepts a portion of a target illumination signal and passes such signal to the rear receiver 31 wherein it is processed in a known manner to provide a coherent reference signal for the receiver 17.

As mentioned briefly hereinabove, here the digital computer 21 includes an observer filter 22. Because it is difficult to know all of the inputs, such as initial conditions and target maneuvers, output measurements are taken by the seeker 10 and compared to an estimate of these measurements provided by the observer filter 22 to create an error signal. The error signal is modified, as to be described hereinafter, by control circuitry (not shown) and the result is fed back to the observer filter 22 to modify the elements of the system states. The observer filter 22 is called an "asymptotic observer" because, for constant target maneuver or initial conditions, the observer filter 22 will asymptotically approach the exact value of the states.

In the guidance system 100, the seeker 10 generates a range rate (closing velocity) signal, $\dot{R}_m$ and a line-of-sight rate signal, $\dot{\lambda}_m$, which epitomize measurements of closing velocity and line-of-sight rate, respectively. Additionally, the seeker 10 generates a lateral acceleration signal $\ddot{y}_m$, and a longitudinal acceleration Signal $\ddot{X}_M$, which epitomize measurements of the missile lateral acceleration and the missile longitudinal acceleration, respectively. Using the aforementioned signals, the observer filter 22 (as described hereinafter) will generate an estimated range rate signal, $\dot{R}_{est}$, and an estimated line-of-sight rate signal, $\dot{\lambda}_{est}$, which are then used to provide error signals to correct the states of observer filter 22.

Figure 2:
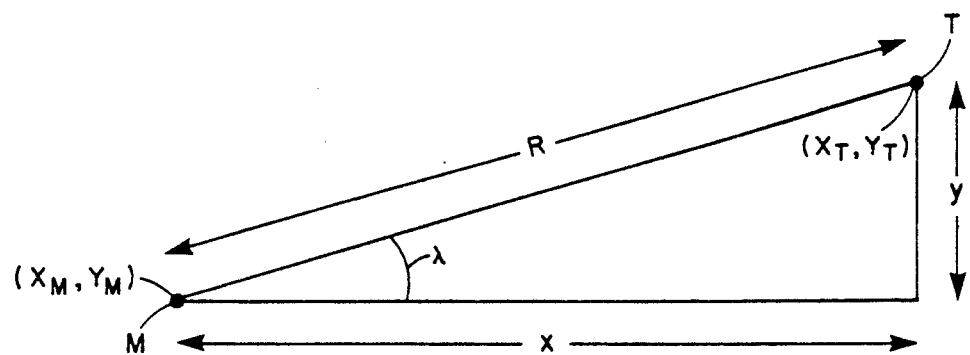
FIG. 2 is a sketch of a typical homing missile engagement useful in understanding the contemplated guidance system.

Referring now to FIG. 2, in an exemplary homing missile engagement, the missile, M, at a location $(X_M, Y_M)$ is shown to be at a range, R, from a target, T, at a location $(X_T, Y_T)$. The normal distance, y, from the missile, M, to the target, T, is given by:

$$y = R \sin\lambda \qquad \text{(Eq. 1)}$$

where $y = Y_T - Y_M$ and $\lambda$ is the line-of-sight angle between the missile, M, and the target, T. The distance, X, is given by:

$$X = R \cos\lambda \qquad \text{(Eq. 2)}$$

where $X = X_T - X_M$.

Taking the second derivative of both Equations 1 and 2 yields, respectively:

$$\ddot{y} = (R\ddot{\lambda} + 2\dot{R}\dot{\lambda})\cos\lambda + (\ddot{R} - R\dot{\lambda}^2)\sin\lambda \qquad \text{(Eq. 3)}$$

$$\ddot{X} = -(R\ddot{\lambda} + 2\dot{R}\dot{\lambda})\sin\lambda + (\ddot{R} - R\dot{\lambda}^2)\cos\lambda \qquad \text{(Eq. 4)}$$

At intercept Equations (3) and (4) may be expressed, respectively, as:

$$\ddot{y} = R\ddot{\lambda} + 2\dot{R}\dot{\lambda} \qquad \text{(Eq. 5)}$$

$$\ddot{X} = \ddot{R} - R\dot{\lambda}^2 \qquad \text{(Eq. 6)}$$

Equations (5) and (6) may be rewritten in the form:

$$\ddot{\lambda} = \frac{\ddot{y} - 2\dot{R}\dot{\lambda}}{R} \qquad \text{(Eq. 7)}$$

$$\ddot{R} = \ddot{X} + R\dot{\lambda}^2 \qquad \text{(Eq. 8)}$$

The $\ddot{y}$ and $\ddot{X}$ terms may be expressed as $$\ddot{y} = \ddot{y}_T - \ddot{y}_M \qquad \text{(Eq. 9)}$$

$$\ddot{X} = \ddot{X}_T - \ddot{X}_M \qquad \text{(Eq. 10)}$$

and, therefore, Equations (7) and (8) may be reduced to the following:

$$\ddot{\lambda} = (\ddot{y}_T - \ddot{y}_M - 2\dot{R}\dot{\lambda})/R \qquad \text{(Eq. 11)}$$

$$\ddot{X}_T - \ddot{X}_M + R\dot{\lambda}^2 \qquad \text{(Eq. 12)}$$

where $\ddot{\lambda}$ the line-of-sight acceleration, R equals the range from the missile to the target, $\ddot{y}_T$ equals the lateral acceleration of the target, $\ddot{y}_M$ equals the lateral acceleration of the missile, $\dot{R}$ equals the range rate (closing velocity) of the missile to the target, $\dot{\lambda}$ equals the line-of-sight rate, $\ddot{R}$ equals the range acceleration, $\ddot{X}_T$ equals the longitudinal acceleration of the target and $\ddot{X}_M$ equals the longitudinal acceleration of the missile. Equations (11) and (12) are, respectively, plant equations for an angle observer 71 (FIG. 4) and a range observer 91 (FIG. 5) of observer filter 22 (FIG. 1) to be described in detail hereinafter. Suffice it here to say that an observer can be used to reconstruct missing state-variable information necessary for control of a system as explained in an article entitled "An Introduction to Observers" by D. G. Leunberger, IEEE Transactions on Automatic Control, Vol. AC-16, No. 6, Dec. 1971, pp. 596–602. A more detailed exposition of observer theory is given in Chapter 4 of the text entitled "Linear Systems" by T. Kailath, Prentice Hall, Inc., Englewood Cliffs, New Jersey, wherein it is noted that the difference between using an output feedback control system and an observer is that in the case of an observer both the input and the output are fed into a control loop. Otherwise stated, observer theory operates on the premise that control of any system is optimal if full state feedback can be utilized, but the theory recognizes that it may not be possible, or desirable, to measure all of the state variables, process them and feed them back to the control variable in order to achieve the optimal performance. Therefore, an observer filter 22 (FIG. 1) should be constructed that matches the dynamics and the inputs to the extent that they are known, a priori, or can be measured.

Figure 3:
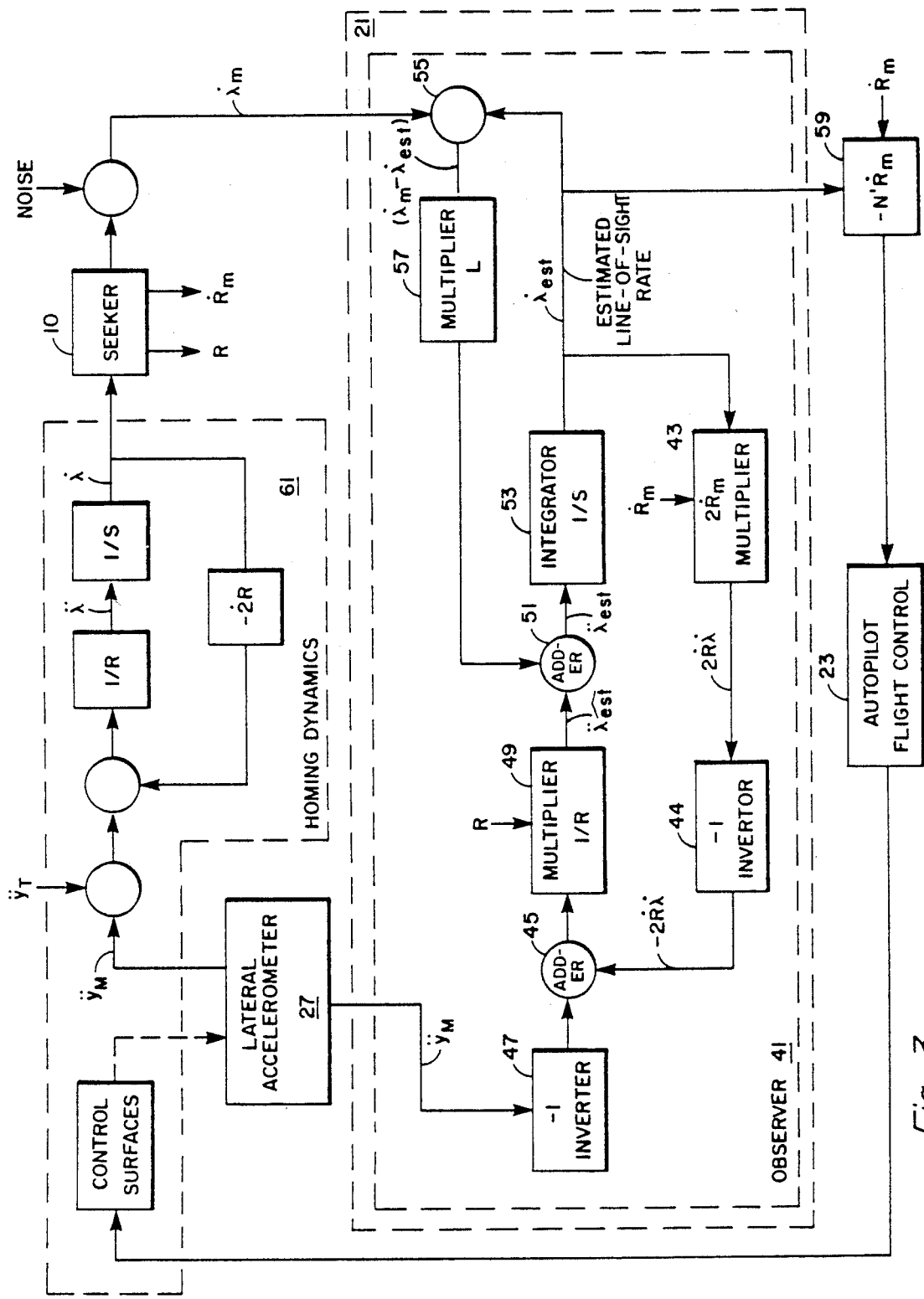
FIG. 3 is a functional block diagram of a proportional navigation guidance system employing an observer filter.

Referring now to FIG. 3, observer filter 41 implementing the plant equation given by equation (11) is illustrated. The plant equation describes the part of the system which is to be controlled and where parameters are unalterable. The control variable is the missile line-of-sight lateral acceleration signal, $\ddot{y}_M$, obtained from the lateral accelerometer 27 and the state variable is the line-of-sight rate signal, $\dot{\lambda}$.

An observer filter 41 is constructed from Equation (11) with the exception that neither the initial condition of the state variable, the line-of-sight rate, $\dot{\lambda}$, nor the target acceleration are explicitly known. The missile lateral acceleration $y_M$ is measured directly by the lateral accelerometer 27 and the line-of-sight rate $\dot{\lambda}$ is obtained by filtering the measured boresight error data. Thus, one of the input signals to the digital computer 21 is a measured line-of-sight rate signal, $\dot{\lambda}_m$, which is the line-of-sight rate, $\dot{\lambda}$, contaminated by noise, which may be either normal noise or jamming. Within the observer filter 41 a signal which represents the difference between the measured line-of-sight rate signal, $\dot{\lambda}_m$, and an estimated line-of sight rate signal $\dot{\lambda}_{est}$, (developed as described hereinafter), is provided by feeding said signals to a subtractor 55. The resulting difference signal is multiplied by a feedback gain, L, to correct an estimated line-of-sight acceleration signal $\ddot{\lambda}_{est}$. Thus, within the observer filter 41, the estimated line-of-sight rate signal, is multiplied in a multiplier 43 by a signal which represents twice the measured range rate signal, $\dot{R}_m$, (obtained in a manner as described in detail hereinafter) to provide a signal representing a product, $2\dot{R}_m\dot{\lambda}$. The latter, after being inverted by inverter 44, is added in an adder 45 with a signal that is the negative of the missile lateral acceleration rate signal, $\ddot{y}_M$, to form a signal representing the quantity $(-\ddot{y}_M - 2\dot{R}\dot{\lambda})$. The signal $-Y_M$ which is the negative of the missile lateral acceleration rate signal, $\ddot{y}_M$, is provided by measuring the missile lateral acceleration, $\ddot{y}_M$, with the lateral accelerometer 27 and passing the output signal of the lateral accelerometer 27 through an inverter 47, thereby providing the requisite signal. The quantity $(-\ddot{y}_m - 2\dot{R}\dot{\lambda})$ is multiplied in a multiplier 49 with the reciprocal of the missile-to-target range signal, R, to form an uncorrected estimated line-of-sight acceleration signal, $\ddot{\lambda}_{est}$, given by Equation (11) without the lateral acceleration of the target (not shown). The uncorrected, estimated line-of-sight acceleration signal $\ddot{\lambda}_{est}$ is combined in an adder 51 with a feedback signal which is an error signal and represents the difference between the measured line-of-sight rate signal, $\dot{\lambda}_m$, and the estimated line-of-sight rate signal, $\dot{\lambda}_{est}$, multiplied by a gain of L. The resulting signal from adder 51 is integrated in an integrator 53 to provide the estimated line-of-sight rate signal, $\dot{\lambda}_{est}$.

As mentioned briefly hereinbefore, the estimated line-of-sight rate signal, $\dot{\lambda}_{est}$, is differenced in a subtractor 55 with the measured line-of-sight rate signal $\dot{\lambda}_m$, and the result is multiplied in a multiplier 57 by a feedback gain, L, and provided as the second input signal to the adder 51. The estimated line-of-sight rate signal $\dot{\lambda}_{est}$ is also provided to multiplier 43 as described hereinbefore.

The estimated line-of-sight rate signal, $\dot{\lambda}_{est}$ is also fed from the observer filter 41 to a multiplier 59 where it is multiplied with a signal representing the quantity, $-N1\ R_m$, where N1 is the effective navigation ratio and $\dot{R}_m$ is the measured range rate. The output signal from the multiplier 59 is provided as an acceleration command signal to the autopilot 23. As mentioned briefly hereinbefore, the autopilot 23 converts the acceleration command signal into control signals for the missile control surfaces (not shown). The resulting change in missile attitude is modeled by homing dynamics 61, which here is an implementation of Equation 11, and results in changes in both the measured line-of-sight rate signal, $\dot{\lambda}_m$, and the missile lateral acceleration signal, $\ddot{y}_M$.

If it is assumed that in ideal proportional navigation the missile lateral acceleration is given by:

$$\ddot{y}_M = -N^1\dot{R}\dot{\lambda} \qquad \text{(Eq. 13)}$$

then equation (11) becomes:

$$\ddot{\lambda} = (\ddot{y}_T + (N^1 - 2)\dot{R}\dot{\lambda})/R \qquad \text{(Eq. 14)}$$

The $\ddot{\lambda}_{est}$ formed by the observer 41 may be expressed as:

$$\ddot{\lambda}_{est} = (-\ddot{y}_M - 2\dot{R} \dot{\lambda}_{est})/R + L(\lambda_m - \lambda_{est}) \quad \text{(Eq. 15)}$$

or $$\ddot{\lambda}_{est} = -\ddot{y}_M/R + L\lambda_m - (\dot{R}/R)\dot{\lambda}_{est}(LR/\dot{R}+2) \quad \text{(Eq. 16)}$$

Equating the $\lambda$ coefficients in Equation (14) with that of $\lambda_{est}$ in Equation (16) yields the following value for the observer gain:

$$L = -N^1\dot{R}/R \quad \text{(Eq. 17)}$$

Consequently, the gain of the observer 41 should vary with range, R, and range rate, $\dot{R}$, as shown in Equation (17) in order to provide ideal proportional navigation.

Figure 4:
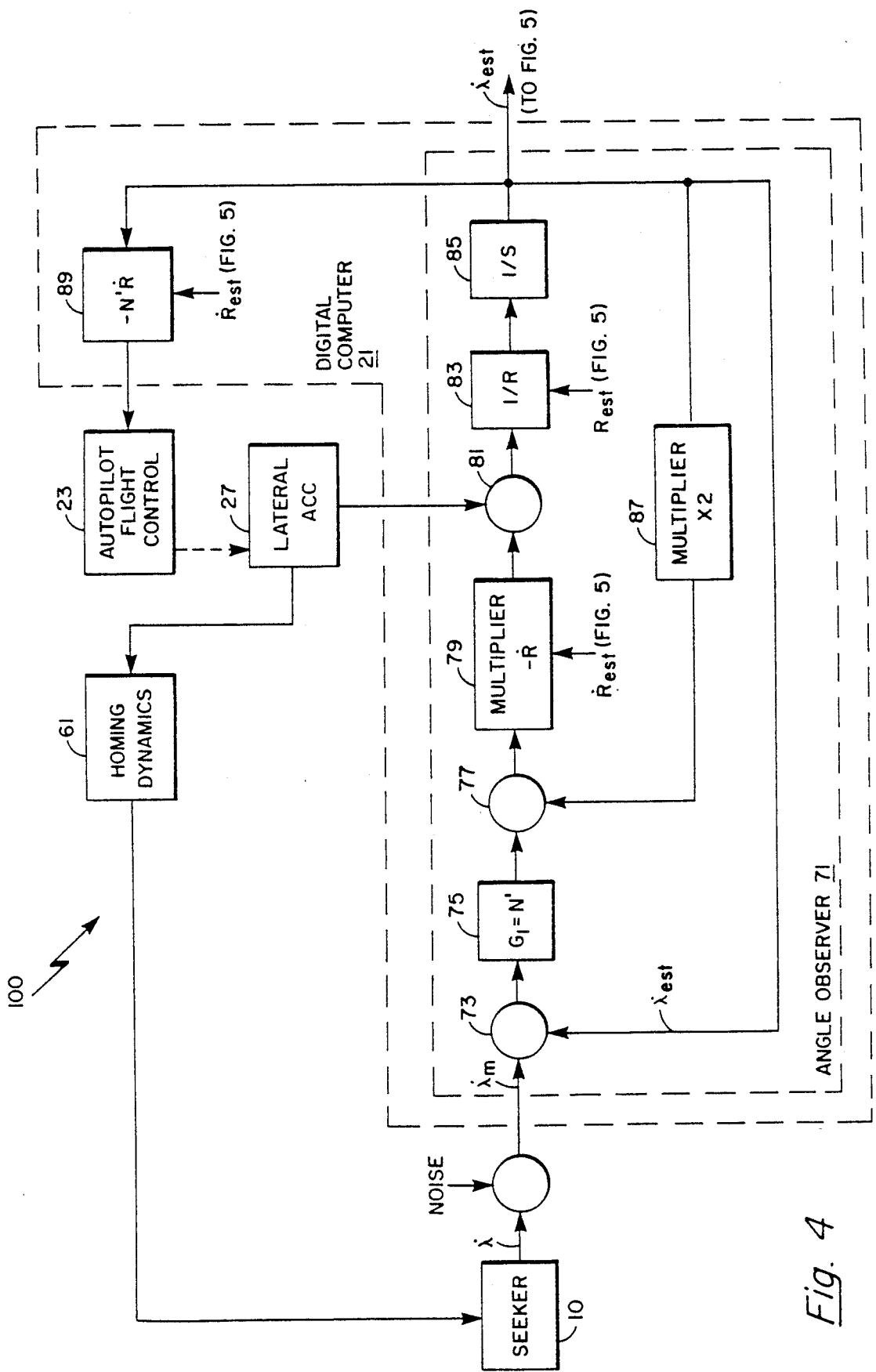
FIG. 4 is a simplified block diagram representation of the guidance system of FIG. 3.

Referring now to FIG. 4, an angle observer 71 wherein the observer gain varies with both R and $\dot{R}$ is shown. Equation (16) is the plant equation for the angle observer 71. Before proceeding with a detailed description of the latter, it should be noted that the contemplated angle observer 71 is implemented within the digital computer 21. The inputs to digital computer 21 are the missile lateral acceleration signals $\ddot{y}_m$ from the lateral accelerometer 27 and the measured line-of-sight rate signal, $\lambda_m$, from the receiver 17 (FIG. 1).

Within the angle observer 71 the estimated line-of-sight rate signal, $\dot{\lambda}_{est}$, is differenced in a subtractor 73 with the measured line-of-sight rate signal, $\lambda_m$, producing a difference signal, $(\lambda_m - \dot{\lambda}_{est})$, which is multiplied in a multiplier 75 by a gain $G_1$ where $G_1 = N^1$. The output signal from the multiplier 75 combined in an adder 77 with a signal 2 $\dot{\lambda}_{est}$ representing twice the estimated line-of-sight rate obtained as described hereinafter. The resulting output signal from the adder 77 is therefore in the form of the following:

$$N^1(\lambda_m - \dot{\lambda}_{est}) + 2\dot{\lambda}_{est} \quad \text{(Eq. 18)}$$

The output signal from the adder 77 is multiplied in a multiplier 79 with the negative of the range rate, $\dot{R}$, to produce a signal representing:

$$-N^1 \dot{R}(\lambda_m - \dot{\lambda}_{est}) - 2 \dot{R}\dot{\lambda}_{est} \quad \text{(Eq. 19)}$$

The latter is combined in an adder 81 with the negative of the output signal, $-\ddot{y}_M$, from the lateral accelerometer 27. The output signal from the adder 81 is multiplied in a multiplier 83 with the reciprocal of the range, $1/R$, to provide an estimated line-of-sight acceleration signal, $\ddot{\lambda}_{est}$, given by:

$$\ddot{\lambda}_{est} = (N^1\dot{R}/R)(\lambda_m - \dot{\lambda}_{est}) - (2 \dot{R}/R) \dot{\lambda}_{est} - \ddot{y}_M/R \quad \text{(Eq. 20)}$$

It can be readily seen that Equation (20) is equivalent to Equation (16), the plant equation for the angle observer 71. The estimated line-of-sight acceleration signal, $\ddot{\lambda}_{est}$, from the multiplier 83 is integrated in an integrator 85 to provide the estimated line-of-sight rate signal, $\dot{\lambda}_{est}$, which is provided as an input signal to adder 73 (as described hereinbefore), to a multiplier 87 and to a multiplier 89. The estimated line-of-sight rate signal $\dot{\lambda}_{est}$ is multiplied by two by the multiplier 87 to produce the signal, 2 $\dot{\lambda}_{est}$, representing twice the estimated line-of-sight rate which, as described hereinbefore, is fed to the adder 77. Additionally, the estimated line-of-sight rate signal, $\dot{\lambda}_{est}$, is multiplied by the quantity, $-N^1 \dot{R}$, in the multiplier 89 to develop an acceleration command signal that is provided by the digital computer 21 to the autopilot 23. As mentioned hereinbefore, the latter is effective to convert such acceleration command signal into corresponding control signals for the missile control surfaces (not shown). A resulting change in missile attitude is detected via the homing dynamics in the missile seeker 10 (FIG. 1) wherein a new measured line-of-sight rate signal, $\lambda_m$, is developed.

If, for any reason, the seeker 10 (FIG. 1) were to cease target tracking as, for example, in the case of a target fade, the angle observer 71 would to use its estimated line-of-sight rate signal, $\dot{\lambda}_{est}$, for precessing the seeker 10 (FIG. 1) so that it continues to look in the direction of the predicted target position. Furthermore, the angle observer 71 continues to develop acceleration command signals that are used to maneuver the missile (not shown) to follow an intercept trajectory. Consequently, when the target fade is over, the seeker 10 (FIG. 1) is looking in the right place for target reacquisition and the missile (not shown) is flying in the proper direction to effect a target intercept.

The angle observer 71 requires an estimate of range, $\dot{R}$, and range rate for those cases where the missile velocity is changing rapidly, such as the boost phase of flight or during large terminal slow-down.

Figure 5:
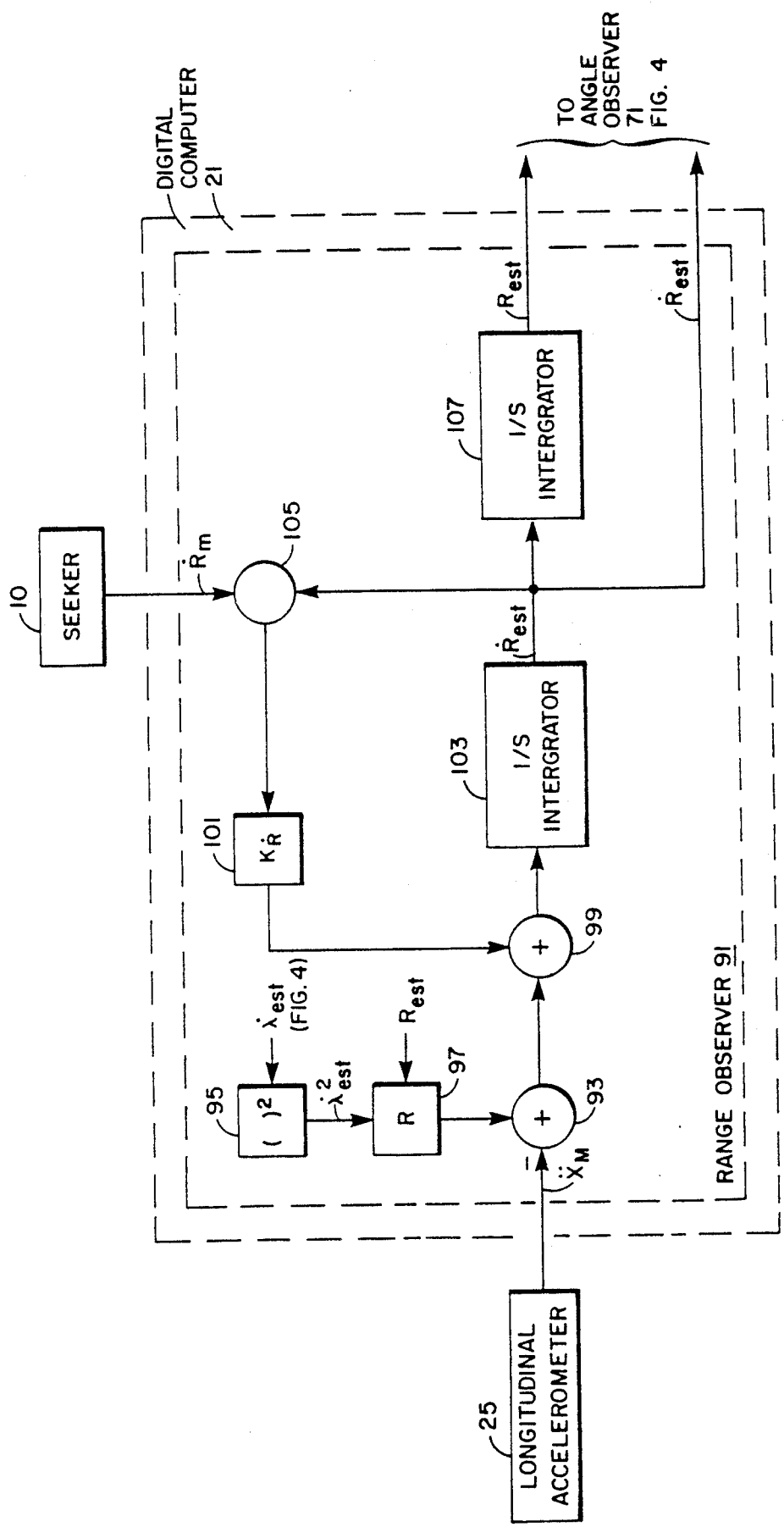
FIG. 5 is a functional block diagram illustrating how range rate signals are processed in the contemplated guidance system.

Referring now to FIG. 5, a range observer 91 according to this invention is shown as formed within the digital computer 21. Input signals to the range observer 91 include a measured closing range rate signal, $\dot{R}_m$, from the digital and analog signal input section 19 (FIG. 1) within the seeker 10, and a longitudinal acceleration signal, $\ddot{X}_M$, from the longitudinal accelerometer 25. The plant equation for the range observer 91 is Equation 12. Within the range observer 91, the estimated line-of-sight rate signal, $\dot{\lambda}_{est}$, from the angle observer 71 (FIG. 4) is squared in a multiplier 95 and the output signal of the latter is subsequently multiplied in a multiplier 97 with the estimated missile-to-target range signal, R$_{est}$, forming a signal representing $R_{est}\dot{\lambda}^2_{est}$. Such signal is added in an adder 93 with the negative of the missile longitudinal acceleration signal, $\ddot{X}_M$, from the longitudinal accelerometer 25. The resulting estimated range acceleration signal, $\ddot{R}_{est}$, which equals $R\dot{\lambda}^2 - \ddot{X}_M$, from the adder 93 is provided as an input signal to an adder 99 wherein it is combined with a range rate feedback error signal, $K(\dot{R}_m - \dot{R}_{est})$, which is developed as described hereinafter, forming an output signal. The latter is integrated in an integrator 103 to develop an estimated range rate signal, $\dot{R}_{est}$. The estimated range rate signal, $\dot{R}_{est}$, is differenced in a subtractor 105 with the measured range rate signal, $\dot{R}_m$, from the seeker 10. A range rate error signal from the adder 105 is multiplied in a multiplier 101 by a factor $K_{\dot{R}}$ ($K_{\dot{R}}$ being the effective range rate ratio of the system) forming the range rate feedback error signal which is applied to adder 99 as described hereinbefore. In addition to being applied to the subtractor 105, the estimated range rate signal, $\dot{R}_{est}$, is provided as an input to the angle observer 71 (FIG. 4) and also integrated in an integrator 107 to develop an estimated range signal, R$_{est}$. The estimated range signal, R$_{est}$, is provided as an input to both the angle observer 71 (FIG. 4) and, as described hereinbefore, the multiplier 97.

It should be noted here that the range observer 91 is initialized at launch, and if the seeker 10 is not locked at that time, $K_{\dot{R}}$ is set to zero, which means that the longitudinal acceleration signal, $\ddot{X}_M$, from the longitudinal accelerometer 25 and the estimated line-of-sight rate signal, $\lambda_{est}$, from the angle observer 71 (FIG. 4) are the main drivers of the range observer 91. When the seeker 10 achieves lock, $K_R$ is set to its proper value and the range observer 91 is continuously corrected by the signal developed from the error between the measured range rate signal, $\dot{R}_m$, from the digital and analog signal input section 19 (FIG. 1) within the seeker 10 and the estimated range rate signal, $\dot{R}_{est}$, from the range observer 91.

It will be appreciated by those of skill in the art that the range rate error signal, $\dot{R}_m - \dot{R}_{est}$, from the subtractor 105 is useful in protecting the seeker 10 against velocity gate pull-off jammers. That is to say, if the range rate error becomes large in a short period of time, then the measured range rate signal, $\dot{R}_m$, must be diverging because the estimated range rate, $\dot{R}_{est}$, is obtained from the output of the integrator 103 and, therefore, cannot change rapidly. As a consequence, a signal from a velocity gate pulloff jammer must be pulling the Doppler tracking gate (not shown, within the receiver 17 (FIG. 1)) off of the target return signal. In this situation, the observer 91 maintains the estimated range rate signal, $\dot{R}_{est}$ closer to the best estimate of the range rate.

Referring back again to FIG. 4, since the contemplated guidance system 100 utilizes both range, R, and range rate, $\dot{R}$, information, it is appropriate to consider the sensitivity of the system to the accuracy of these quantities. The angle observer 71 has a gain term of $1/R_{est}$ which goes to infinity as range goes to zero. Further, if the range estimate signal, $R_{est}$, has a negative bias error, the miss distance will grow exponentially. However, if the estimated range signal, $R_{est}$, is limited to a small number, negative biases in the range estimate signal will not substantially degrade miss at all. Consequently, a lower limit must be used for $R_{est}$ in the angle observer 71, but the performance of the contemplated guidance system is not sensitive to the actual value of this limit.

The estimated range rate signal, $\dot{R}_{est}$, is used not only in the angle observer 71, but also in deriving the acceleration command signals for the autopilot 23. The performance of the guidance system is not sensitive to the estimated range rate signal, $\dot{R}_{est}$, used in the angle observer 71, but the performance is sensitive to the value of the estimated range rate signal, $\dot{R}_{est}$, used to develop the acceleration command signals used for the autopilot 23.

Therefore, the contemplated guidance system 100 needs to limit the value of range used to a minimum, $R_{MIN}$, where $R_{MIN}$ is chosen based on expected bias errors in the range estimate, $R_{est}$. When this is done, the guidance system 100 has roughly the same insensitivity to range and range rate errors as a conventional proportional navigation guidance system.

Figure 6:
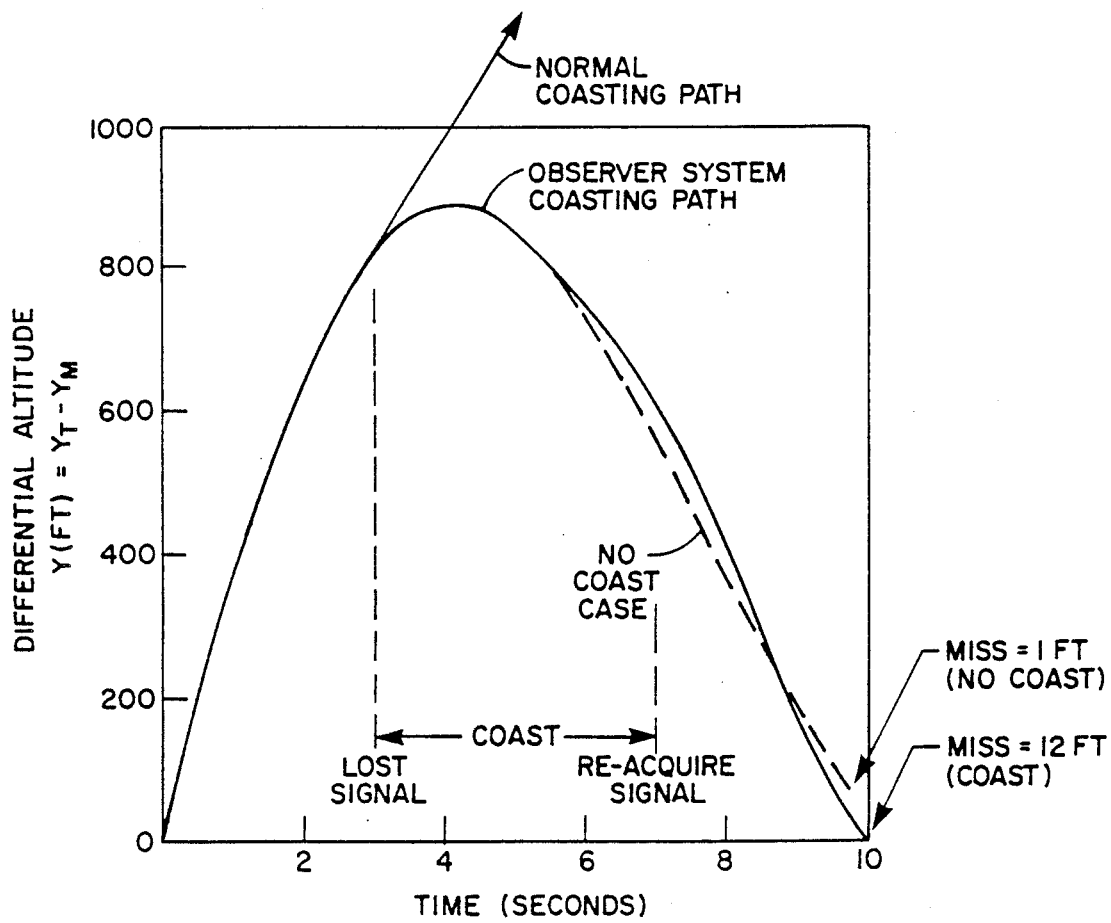
FIG. 6 is a sketch of an up-and-over target engagement useful in demonstrating the efficacy of the contemplated guidance system.

Referring now to FIG. 6, the efficacy of the contemplated guidance system 100 in providing guidance in the event of a target fade will be explained. Thus, illustrated in FIG. 6 is an up-and-over target engagement trajectory. If the target return signal (not shown) is lost on the upward portion of the up-and-over trajectory, a known proportional navigation system would enter a coast mode and the missile would continue to fly in a straight line, as shown. If the missile seeker (not shown) is not precessed properly, the target (not shown) will soon pass out of the seeker antenna beamwidth and after the target fade ends, reacquisition will not occur. In the trajectory illustrated, if the target return signal is never lost, the known proportional navigation guidance system will achieve a miss distance of approximately one foot. Conversely, if the target return signal is lost three seconds into flight and is lost for a time interval of four seconds, the known proportional navigational guidance system (not shown) will lose lock altogether and a very large miss distance will result.

In the contemplated guidance system 100 (FIG. 4), if the target return signal is lost three seconds into flight, the angle observer 71 (FIG. 4) continues to generate an estimate of the line-of-sight rate consistent with the engagement. This estimate of the line-of-sight rate is used to keep the missile (not shown) pointed at the target (not shown). The estimate of the line-of-sight rate is used to generate the proper acceleration command signals for the autopilot 23 (FIG. 4) to effect a target intercept. When the target return signal returns, the contemplated guidance system 100, (FIG. 4), is looking at the target (not shown), so reacquisition is accomplished. Normal homing takes place and a target intercept occurs. For the engagement shown, with four seconds of coast in the middle of a ten second flight, the miss is increased from approximately one foot to approximately twelve feet, which is quite acceptable.

Having described preferred embodiments of the invention, it will now be apparent to one of skill in the art that other embodiments incorporating their concepts may be used. It is felt, therefore, that these embodiments should not be limited to the disclosed embodiments, but rather should be limited only by the spirit and scope of the appended claims.

What is claimed is:

1. A guidance system comprising:
   first means, responsive to a lateral acceleration signal, a measured line-of-sight rate signal, a measured range rate signal and a range signal, for providing an estimated line-of-sight rate signal, the first means further comprising:
   (a) means, responsive to the measured line-of-sight rate signal and the estimated line-of-sight rate signal, for producing a difference output signal; and
   (b) means, responsive to the difference output signal, for producing an error signal which is applied to the first providing means to minimize the difference output signal.

2. The guidance system as recited in claim 1 wherein the first providing means further comprises:
   (a) second means, responsive to the lateral acceleration signal and the estimated line-of-sight rate signal, for providing an estimated line-of-sight acceleration signal;
   (b) means, responsive to the error signal and the estimated line-of-sight acceleration signal, for producing a corrected estimated line-of-sight acceleration signal; and
   (c) means, responsive to the corrected estimated line-of-sight acceleration signal, for producing the estimated line-of-sight rate signal.

3. A guidance system for a missile comprising:
   (a) estimated range rate means, responsive to an estimated line-of-sight rate signal, a longitudinal acceleration signal and a measured range rate signal, for providing an estimated range rate signal;
   (b) estimated range means, responsive to the estimated range rate signal, for providing an estimated range signal; and
   (c) estimated line-of-sight rate means, responsive to a measured line-of-sight rate signal, the estimated range rate signal, the estimated range signal and a lateral acceleration signal, for providing an estimated line-of-sight rate signal.

4. The guidance system as recited in claim 3 wherein the estimated range rate means comprises:
  (a) range acceleration means, responsive to the longitudinal acceleration signal, the estimated line-of-sight rate signal and the estimated range signal, for providing a range acceleration signal;
  (b) means, responsive to the measured range rate signal and the estimated range rate signal, for producing a range rate difference signal; and
  (c) range rate error signal means, responsive to the range rate difference signal, for providing a range rate error signal and for adding the range rate error signal to the range acceleration signal for minimizing the range rate difference signal.

5. The guidance system as recited in claim 4 wherein the estimated line-of-sight means comprises:
  (a) means, responsive to the measured line-of-sight rate signal and the estimated line-of-sight rate signal, for producing a line-of-sight difference signal;
  (b) line-of-sight acceleration means, responsive to the lateral acceleration signal, the estimated range signal, the estimated range rate signal and the line-of-sight difference signal, for providing a line-of-sight acceleration signal; and
  (c) means, responsive to the line-of-sight acceleration signal, for producing the estimated line-of-sight rate signal.

6. A guidance system comprising:
  (a) a seeker having a range, a range rate, a line-of-sight and a line-of-sight rate from the seeker to a distant object, the seeker producing a measured line-of-sight rate signal, a measured range rate signal, a longitudinal acceleration signal and a lateral acceleration signal;
  (b) a filter comprising:
    (i) means, responsive to an estimated line-of-sight rate signal, the longitudinal acceleration signal and the measured range rate signal, for providing the estimated range rate signal;
    (ii) means, responsive to the estimated range rate signal, for providing an estimated range signal; and
    (iii) means, responsive to the measured line-of-sight rate signal, the estimated range rate signal, the estimated range signal and the lateral acceleration signal, for providing an estimated line-of-sight rate signal; and
  (c) means, responsive to the estimated line-of-sight rate signal and the estimated range rate signal, for providing requisite guidance control signals for an autopilot absent a measured range rate signal and a measured line-of-sight rate signal.

* * * * *